March 6, 1951 W. KOENIG, JR 2,544,330

SELECTIVE SIGNALING DEVICE

Filed Nov. 4, 1947 4 Sheets-Sheet 1

INVENTOR
W. KOENIG, JR.
BY J W Schmied
ATTORNEY

March 6, 1951 W. KOENIG, JR 2,544,330

SELECTIVE SIGNALING DEVICE

Filed Nov. 4, 1947 4 Sheets-Sheet 2

INVENTOR
W. KOENIG, JR.
BY J W Schmied
ATTORNEY

March 6, 1951 W. KOENIG, JR 2,544,330

SELECTIVE SIGNALING DEVICE

Filed Nov. 4, 1947 4 Sheets-Sheet 3

INVENTOR
W. KOENIG, JR.
BY J. W. Schmied
ATTORNEY

March 6, 1951 W. KOENIG, JR 2,544,330

SELECTIVE SIGNALING DEVICE

Filed Nov. 4, 1947 4 Sheets-Sheet 4

INVENTOR
W. KOENIG, JR.
BY J W Schmied
ATTORNEY

Patented Mar. 6, 1951 2,544,330

UNITED STATES PATENT OFFICE 2,544,330

SELECTIVE SIGNALING DEVICE

Walter Koenig, Jr., Clifton, N. J., assignor to Bell Telephone Laboratories, Incorporated, New York, N. Y., a corporation of New York Application November 4, 1947, Serial No. 783,897

11 Claims. (Cl. 177—353)

This invention relates to selective signaling devices and more particularly to signaling devices which are adapted to respond to or generate one code out of a plurality of codes.

The usual means for providing a selective apparatus makes use of a stepping device such as the well-known Strowger type selector relay. The Strowger type relay is adapted to serve as a selector in systems wherein the purpose of the selective process is to make a different selection in response to each code of a large number of codes. However, Strowger type selectors are not well adapted for selective signaling in systems such as multiparty telephone lines or mobile radio systems wherein the purpose of the selective process is to make a selective operation in response to only one code out of a large number of codes. Also, Strowger type selectors are not adapted for use in systems in which the presence of false signals is common.

An object of this invention is to provide a simple and inexpensive selective apparatus which is responsive to only one out of a large number of codes and in which the code to which the selector will respond may be changed by simple and inexpensive means.

Another object of this invention is to provide a selective apparatus in which the possibility of false operation of the apparatus in response to noise signals is slight.

A further object of this invention is to provide a device capable of generating an identification code signal.

Other objects and advantages of the invention are within the scope of the invention as will appear from the appended claims.

An understanding of the invention will be derived from the detailed description that follows taken in conjunction with the appended drawings, wherein.

Figures 4, 5:
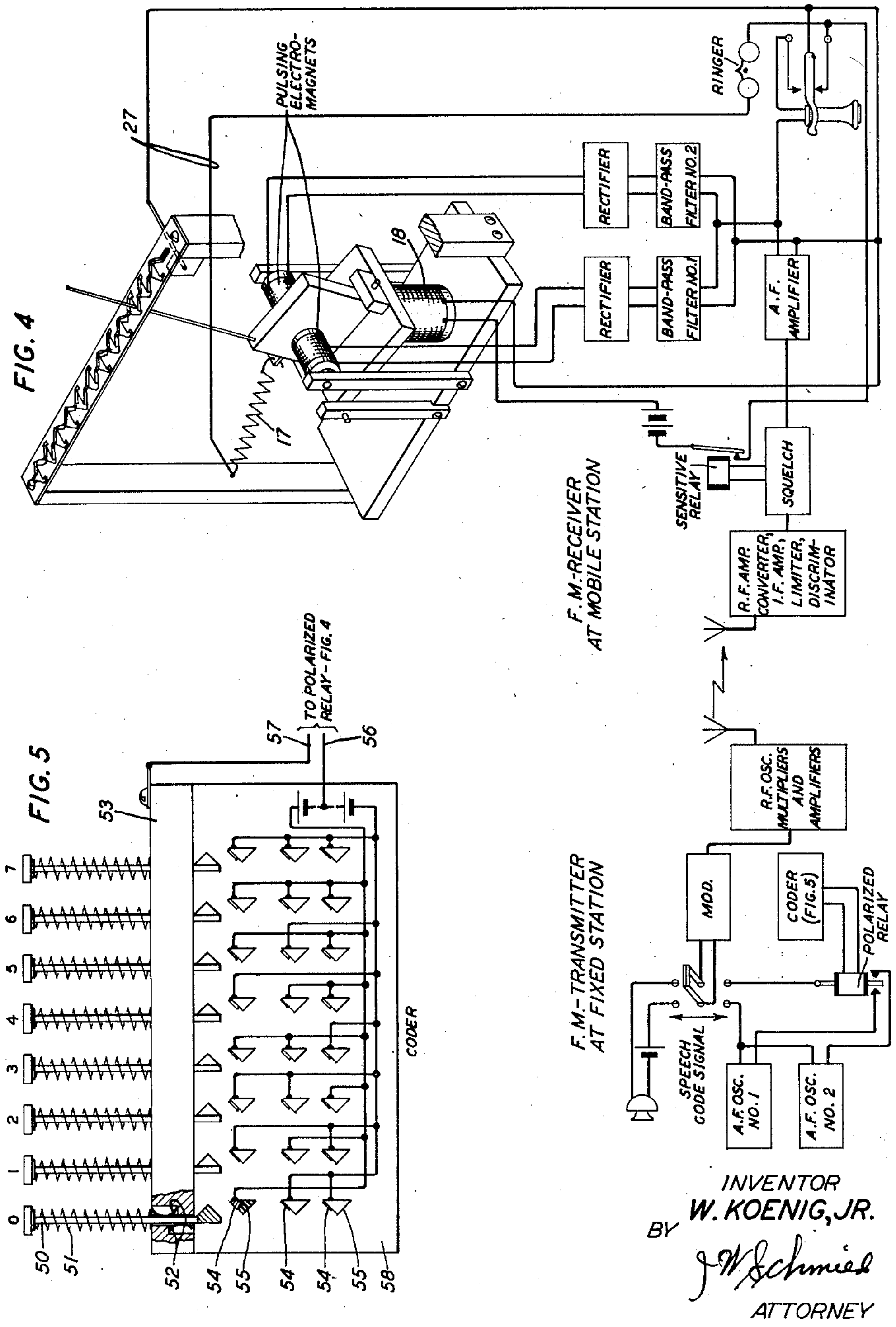
Figures 6, 7, 8, 12:
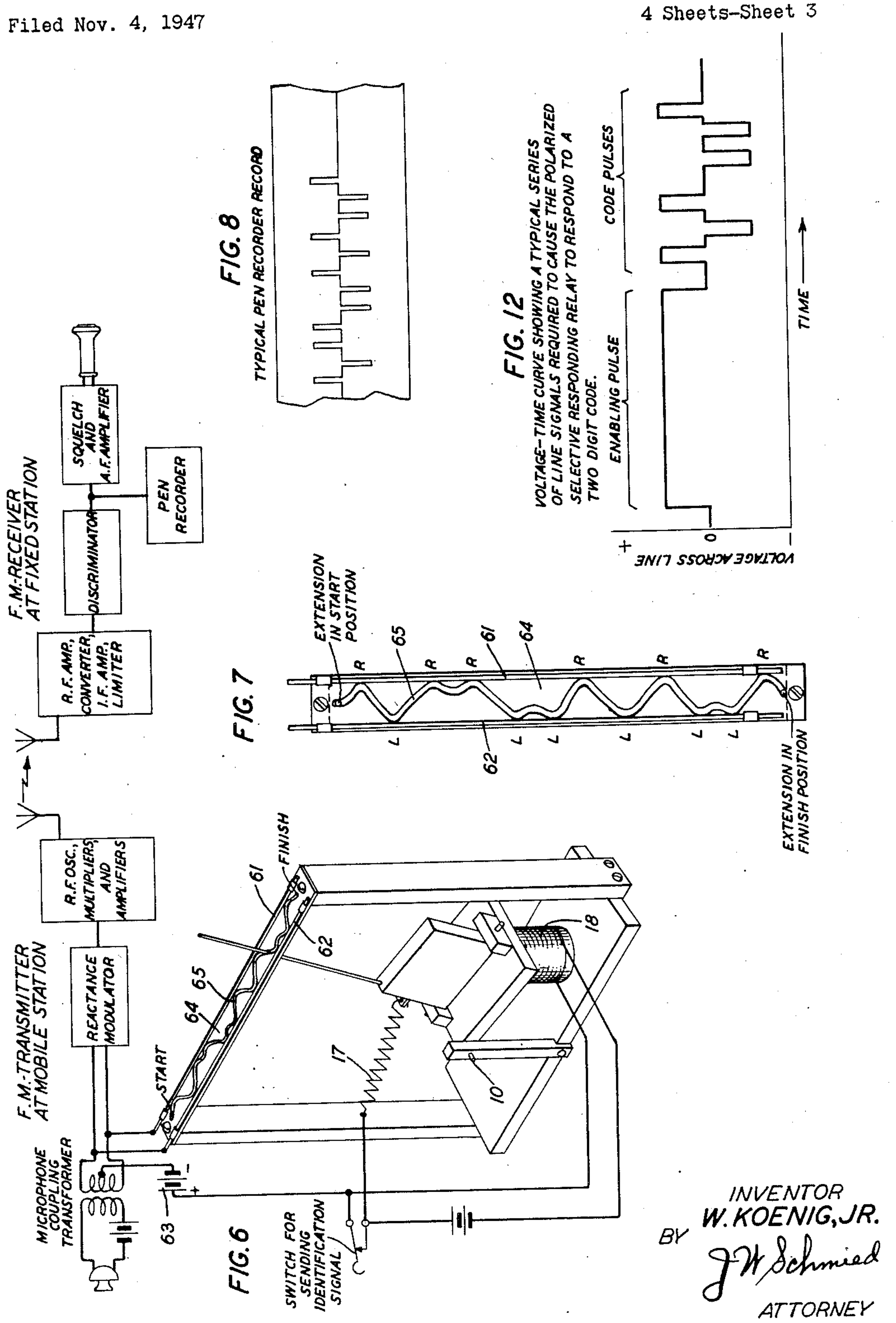
Figure 9:
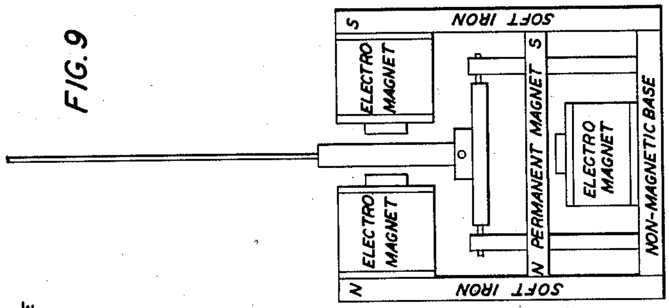
Figures 10, 11:
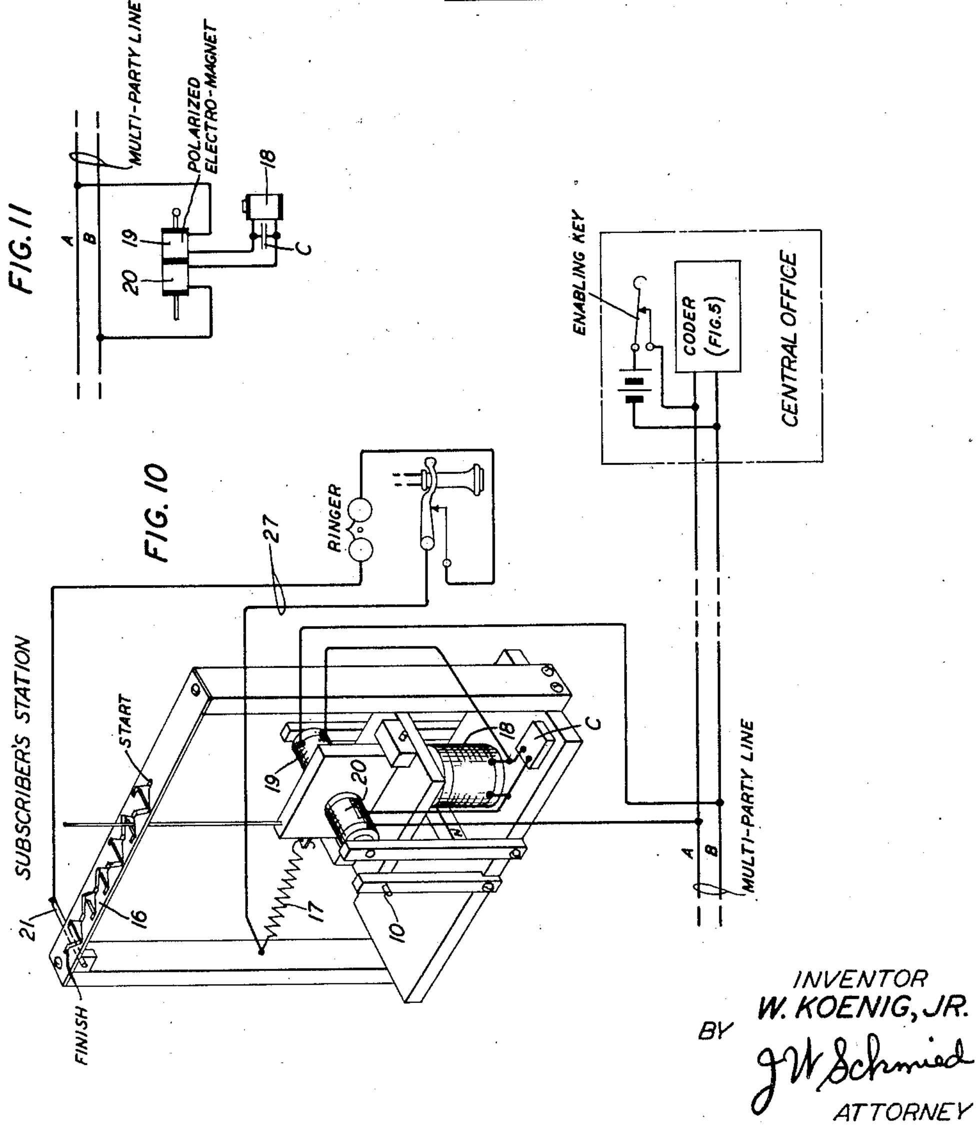

Fig. 4 indicates an application of the selective responding relay as one element of a radio communication system;

Fig. 5 indicates a keyboard-type device capable of generating code signals corresponding to the digits 0 to 7 inclusive;

Fig. 6 indicates an application of the selective signaling device in a communications system to generate identification code signals;

Fig. 7 is a plan view of the guide indicated in Fig. 6;

Fig. 8 indicates a typical pen recorder record as obtained from the apparatus indicated in Fig. 6;

Fig. 9 indicates an elevation view of a selective responding relay in which the guide and the two end supports for the guide are not shown and in which the electromagnets are polarized;

Fig. 10 indicates an application of a polarized selective responding relay to a multiparty telephone line;

Fig. 11 is a schematic diagram of the connections to the electromagnets indicated in Fig. 10; and Fig. 12 indicates a voltage-time curve showing a typical series of line signals required to cause the polarized relay to respond to a two-digit code.

Figure 1:
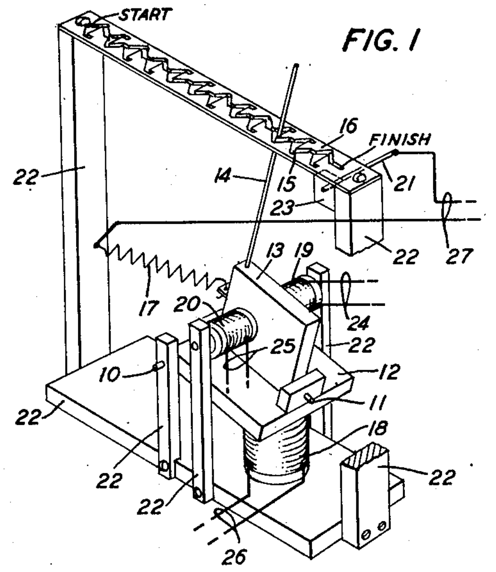
Fig. 1 is an oblique view, partially broken away, which indicates the elements of a selective responding relay which is capable of distinguishing one code from 4,096 codes.
Figure 2:
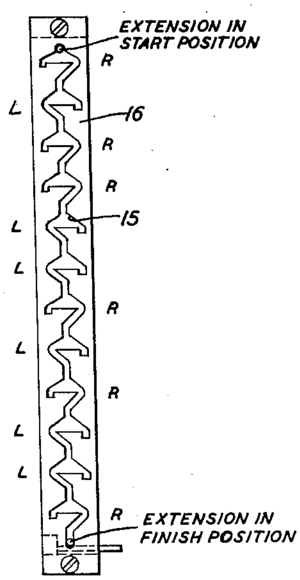
Fig. 2 is a plan view of the guide incorporated in Fig. 1.

An embodiment of the invention as indicated in Fig. 1 comprises an armature 13 which is supported by and free to move about shaft 11. Shaft 11 is supported at each extremity by yoke 12, and yoke 12 is supported by and free to move about shaft 10 which is attached to supporting frame 22. Both armature 13 and yoke 12 are composed of magnetic material and are of light weight so as to permit the armature to follow a rapid succession of movements. A retractile spring 17 is attached to the rear face of the armature and to the supporting frame. Electromagnet 18 is below yoke 12 and is attached to the supporting frame so that its forward extremity is approximately below the front side of yoke 12. Pulsing electromagnets 19 and 20 are secured on each side of armature 13 by supporting frame 22. The pulsing electromagnets are positioned so that armature 13 separates the two electromagnets throughout the traverse of the armature and so that there is sufficient space between each electromagnet and the armature that the armature may move in the path established by guide 16. A rigid extension 14 is attached to armature 13 and movement of the extension is confined to the path established by slots 15 in guide 16. Guide 16 is composed of a rigid material and is attached to supporting frame 22 in such manner that it can be replaced easily. For example, the guide could be made of brass or a plastic and attached to the supporting frame with screws. Slots 15 in guide 16, as indicated in Fig. 1 and Fig. 2 are arranged in steps which are positioned transverse to the length of the guide. The base of the slot of each step is at right angles to the length of the guide and each half of the upper boundary of the slot of each step is sloped from the center of the step towards the finish end of the guide. One side of each step, except the final step at the finish end of the guide, is connected to the center of the succeeding step by two slots, one positioned parallel and the other positioned at an oblique angle to the length of the guide. The interconnecting slot which is parallel to the length of the guide is connected to the center of the succeeding step and serves to stop the sidewise motion of the armature extension as it completes each step. The final step at the finish end of the guide terminates in two slots identical to the interconnecting slots except that the final slot is the dead end of the guide rather than being connected to a step. The side of each step which is not interconnected with another step is provided with a trap which comprises a short, dead-end slot positioned parallel to the length of the guide and at right angles to the base of the step. Conductor 21 is attached to but insulated from the supporting frame by insulator 23. The conductor is positioned below the dead end of the slot at the finish end of the guide so that armature extension 14 rests against the conductor when the extension has completed its clockwise movement.

The guide indicated in Figs. 1 and 2 has 12 steps and will permit the apparatus to distinguish one code from 4,096 codes. The mathematical relation between the number of steps and the number of codes which the apparatus can distinguish is as follows: Number of codes$=2^n$, where $n$ is the number of steps.

The device as indicated in Fig. 1 serves to short the pair of conductors 27 which in turn may be utilized to control other apparatus. This short circuit is formed when armature extension 14 and conductor 21 are contacting one another, and the electrical circuit is completed as follows: From one conductor of pair of conductors 27 to conductor 21 to extension 14 to armature 13 to spring 17 to the other conductor of the pair of conductors 27. It is apparent that the aparatus could be used to mechanically operate a toggle, cross bar or other similar switch by utilizing force obtained from extension 14 to actuate the switching mechanism.

For the relay to complete its response, armature extension 14 must traverse the entire length of the slotted portion of guide 16 from the start to the finish position as labeled on the drawings. Initially armature extension 14 is at the start position of the slotted portion of guide 16 and is secured in this position by spring 17 which tends to pull the armature-yoke combination in a counter-clockwise direction about shaft 10. When energized, electromagnet 18 tends to pull the armature-yoke combination in a clockwise direction about shaft 10 and pulsing electromagnets 19 and 20 tend to move the armature about shaft 11. Electromagnet 18 is energized through the pair of wires 26 by a continuous source of current during the operation of the device. Pulsing electromagnets 19 and 20 are energized through pairs of wires 24 and 25 respectively by pulses of current and only one electromagnet is energized at a time. Each pulse of current is applied only for the period of time required to move the armature extension from the center of a step to one side of a step. If the period of the pulse of current were made appreciably longer, the relay might not function properly since the armature extension might traverse two steps during one pulse or it might become trapped depending upon the position of the extension in the guide. Movement of the armature is confined to the path which armature extension 14 must follow as determined by the slotted portion 15 of guide 16, and in order for the extension to traverse the entire guide from the start to the finish position a continuous clockwise pull must be applied to the armature-yoke combination by electromagnet 18 and a certain sequence of left and right pulls must be applied to the armature by the pulsing electromagnets 19 and 20. In order to complete the partly completed traverse of the guide as indicated in Fig. 1, the armature extension and armature must be pulled first to the left by electromagnet 20, then in a clockwise direction about shaft 10 by electromagnet 18, then to the left by electromagnet 20, then in a clockwise direction about shaft 10 by electromagnet 18, then to the right by electromagnet 19, and finally in a clockwise direction about shaft 10 by electromagnet 18 until extension 14 contacts conductor 21. The sequence of movements which the pulsing electromagnets must impose upon the armature to permit the armature extension to completely traverse guide 16 from start to finish is indicated by the letters L and R placed alongside the drawing in Fig. 2 and is as follows: Right, left, right, right, left, left, right, left, right, left, left, right. Any other sequence of the same number of pulls applied to the armature will cause the armature extension to enter the trap associated with the step corresponding to the first pulse which deviates from the required sequence. Once the armature extension enters a trap, further movement of the extension is prevented until electromagnet 18 is deenergized. Therefore, if a different sequence of the same number of pulses or a false signal, such as voice or noise currents which do not correspond exactly to the required pulses, is applied to the pulsing electromagnets, the armature extension will be trapped before completing its traverse and the relay will not respond. If fewer than the required number of pulses is applied to the electromagnets the armature extension will stop on one of the intermediate steps and thereby be prevented from completing its traverse. If more than the required number of pulses is applied to the electromagnets the armature extension will complete its traverse only if the first twelve pulses correspond exactly to the series of pulses to which the apparatus is designed to respond.

From the foregoing it is apparent that the selective responding relay indicated in Fig. 1 is susceptible to false operation only under conditions which very seldom occur in selective signaling systems.

When all the electromagnets are deenergized, the armature, armature extension and yoke combination is subjected to a counter-clockwise pull about shaft 10 by spring 17. The slots of the guide are sloped so that the armature extension will automatically find its way back to the start position when the armature is pulled in a counter-clockwise direction by spring 17.

Figure 3:
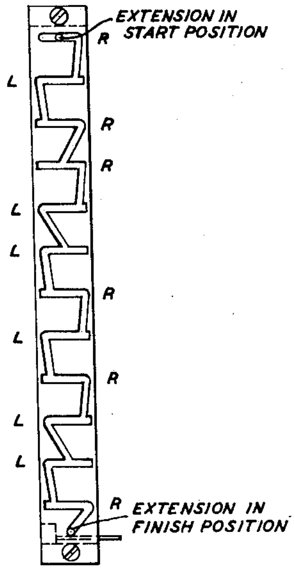
Fig. 3 is a plan view of a modification of the guide as indicated in Fig. 2.

The guide indicated in Fig. 1 and Fig. 2 is disclosed to illustrate a typical example of the invention. It is apparent that a different number of steps can be utilized in such a relay and that a different arrangement of slots can be utilized to achieve the same or a similar result. The guide indicated in Fig. 3 discloses a different arrangement of slots wherein the same series of forces as described for the guide indicated in Fig. 2 must be applied to the armature so as to permit the relay to respond. The guide illustrated by Fig. 3 differs from the guide disclosed in Fig. 2 as follows: There is no provision to trap the armature extension, there are no sections in the interconnecting slots to stop the sidewise motion of the extension at the completion of each step, and the upper boundary of the slots is not sloped thereby preventing the armature extension from automatically finding its way back to the start position under the pull of spring 17. The use of a guide as illustrated in Fig. 3 would require a series of pulses to be applied to the pulsing electromagnets in order to restore the armature extension to its start position after electromagnet 18 has been deenergized. A sequence of pulses, applied alternately by each pulsing electromagnet, will restore any relay using this type guide provided the sequence comprises at least twice as many pulses as are required to operate the relay.

One application of the selective signaling device is in a plurality of mobile radio stations as a selector for energizing each station in response to its corresponding code signal as sent out by a radio transmitter. Fig. 4 illustrates in block diagram form a radio communication system utilizing the selective responding relay as disclosed in Fig. 1.

The radio transmitter is a conventional frequency-modulated type to which code signaling apparatus has been attached. This apparatus comprises a switch adapted to connect either the microphone or the signaling apparatus to the input of the modulator, two audio frequency oscillators which oscillate at different frequencies, a polarized relay, and a coder. Fig. 5 indicates a coder which generates electrical code pulses corresponding to the digits 0, 1, 2, 3, 4, 5, 6 and 7 when a corresponding key is pressed. The coder comprises eight keys 50 composed of a conducting material. Each key is supported by a compressible spring 51, and each is guided by a hole in supporting frame 53 and by two leaf springs 52. Frame 53 serves to support the keys and is an electrical conductor. Below each key is a series of three contacts 54 positioned so that the associated key strikes each contact when the key is depressed by an operator. Each contact 54 is supported by a triangular-shaped insulator 55 which is attached to insulator 58 and is positioned so that its associated key is allowed to strike each contact 54 as the key is depressed and so that the key is not allowed to strike the contact as the key is restored to normal by spring 51 when the key is released by the operator. Each contact is connected to either the positive or the negative terminal of one of two sources of potential, the polarity of each contact being determined by the code signal assigned to the number with which the contact is associated. The terminals of the two sources of potential which are not connected to the contacts are connected together and through conductor 56 to one side of the winding of the polarized relay of Fig. 4. The frame 53 is connected through conductor 57 to the other side of the winding of the polarized relay, thereby permitting the coder to present a voltage of one polarity or the other to the polarized relay each time a key strikes one of the contacts. Each key must be depressed rapidly and at the same rate as the other keys are depressed in order to generate the code pulses of short duration as required by the selective relay. A code signal is generated by the "0" key as follows: The operator depresses key 0 so that it strikes each of its three associated contacts in rapid succession; when the key strikes the upper contact the positive terminal of one of the sources of voltage is connected to conductor 57 through contact 54, key 50, springs 52 and conducting frame 53; when the key strikes the second contact the negative terminal of the other source of voltage is connected to conductor 57; and when the key strikes the lower contact the negative terminal of the source of voltage is again connected to conductor 57. The polarity of the electrical pulses generated for the digits 0 to 7, expressed as the polarity of conductor 57 with respect to conductor 56, is as follows: Digit 0, + − −; digit 1, − + −; digit 2, − − +; digit 3, + + −; digit 4, − + +; digit 5, + − +; digit 6, + + +; and digit 7, − − −. These electrical pulses applied to the polarized relay of Fig. 4 cause the relay armature to move to the right or left depending upon the polarity of the relay winding. Assuming that the armature moves to the right when the positive battery terminal is connected to conductor 57 and the negative battery terminal is connected to conductor 56 and that the signaling apparatus is connected to the frequency modulation transmitter, connection of the positive battery terminal through the coder to conductor 57 serves to close a circuit which connects audio frequency oscillator No. 2 to the input of the modulator of the transmitter, and connection of the negative battery terminal to conductor 57 serves to connect oscillator No. 1 to the modulator. Thus the transmitter is caused to transmit a series of three code signals when each coder key is depressed. If radio frequency signal $F_1$, is generated when audio frequency oscillator 1 is connected to the modulator and radio frequency signal $F_2$ is generated when audio frequency oscillator 2 is connected to the modulator, the radio frequency code signals generated will be as follows: Digit 0, $F_2$—$F_1$—$F_1$; digit 1, $F_1$—$F_2$—$F_1$; digit 2, $F_1$—$F_1$—$F_2$; digit 3, $F_2$—$F_2$—$F_1$; digit 4, $F_1$—$F_2$—$F_2$; digit 5, $F_2$—$F_1$—$F_2$; digit 6, $F_2$—$F_2$—$F_2$; digit 7, $F_1$—$F_1$—$F_1$.

The radio receiver and selective responding relay indicated in Fig. 4 are adapted to respond to the radio frequency code signals as described above. The receiver is a conventional type adapted to respond to frequency-modulated signals and containing a squelch circuit. A sensitive relay is connected to the receiver so that the direct current generated by the squelch circuit to control the receiver response is applied to the sensitive relay. The squelch circuit and sensitive relay are adjusted so that the relay is operated only when a radio frequency signal is received which is of sufficient strength to cause the squelch circuit to enable the receiver. When no signal or a very weak signal is being received the receiver is disabled and the sensitive relay is in an unoperated condition due to the action of the squelch circuit. When the sensitive relay is operated and the telephone hook is down, a circuit is closed which applies potential to winding 18 of the selective responding relay. Thus it is seen that electromagnet 18 of the selective relay is energized only when the telephone hook is down and a fairly strong frequency signal is being received. When the radio frequency code signals $F_1$ and $F_2$ are presented to the receiver, they are converted into audio frequency code signals by the usual process of detection. Two band-pass filters are connected across the audio output terminals of the receiver. Filter No. 1 is designed to pass the same frequency which audio frequency oscillator No. 1 generates in the transmitter and filter No. 2 passes the frequency which oscillator No. 2 generates. Band-pass filter No. 1 is connected through a rectifier to the winding of one of the pulsing electromagnets and filter No. 2 is connected through a rectifier to the other pulsing electromagnet. Thus the audio frequency code pulses are converted to direct current code pulses which serve to pull the selective relay armature to the right or left depending upon the frequency of the code signal presented to the input of the receiver. Radio frequency signal $F_1$, when converted to a direct current code signal, serves to pull the selective relay armature to the left, and signal $F_2$ serves to pull the armature to the right. Movements of the selective relay armature corresponding to the digits 0 to 7 are as follows: Digit 0, right-left-left; digit 1, left-right-left; digit 2, left-left-right; digit 3, right-right-left; digit 4, left–right-right; digit 5, right-left-right; digit 6, right-right-right; digit 7, left-left-left. When relay 18 has been energized and the sequence of movements corresponding to the code to which the selective relay is responsive (the code representing digits 5052 for the relay indicated) has been applied to the armature by the pulsing electromagnets, the selective relay will respond by causing its armature extension to completely traverse the guide, and the output conductors 27 will be shorted thereby energizing the ringer. The ringer serves to produce an audible signal to attract the attention of the operator of the mobile station. Once the selective relay responds it remains in that condition until the telephone hook is lifted when the telephone receiver is removed or until the transmitter at the fixed station ceases to transmit a radio frequency signal. When the telephone hook is lifted or the radio frequency signal cut off, electromagnet 18 of the selective relay is deenergized and the relay armature, yoke, and armature extension are automatically restored to the initial or start position by the action of spring 17.

The apparatus indicated in Fig. 4 is adapted for use in a selective signaling system in which up to 4,096 mobile stations must be signaled by one fixed station. On a four-digit calling number basis the eight digits 0 to 7 are sufficient to provide the required 4,096 calling number combinations. Twelve steps are sufficient for each of the selective relay guides to permit the construction of a different guide for each of the 4,096 stations.

When a mobile station communicates with a fixed station it is often desirable for the fixed station to have some positive means for identifying the mobile station. This occasion arises when a charge is made for each call answered by the fixed station or when the mobile station wishes to make a toll call through the fixed station. Fig. 6 indicates an application of the selective signaling device to a mobile transmitter which permits an operator to send out his identification signal by closing a switch. The transmitter is a conventional frequency-modulated type utilizing a conventional reactance modulator. The selective signaling device is the same as that indicated in Fig. 1 except that the pulsing electromagnets have been removed, the design of the guide has been changed and two conductors 61 and 62 have been added. The guide 64, which is shown in a plan view Fig. 7, is designed so as to permit the armature extension to traverse the slotted portion 65 of the guide when force is applied to the armature-yoke combination by either electromagnet 18 or spring 17.

The initial or start position for the armature extension is at the rear of the guide. When the operator closes the identification switch a circuit is closed which energizes electromagnet 18 and connects the positive terminal of battery 63 to spring 17. Energization of electromagnet 18 causes the yoke, armature and armature extension combination to move in a clockwise direction about shaft 10. As the armature extension moves in a clockwise direction about shaft 10 it traverses the slotted portion of guide 64 from the start position to the finish position, and as the extension traverses the guide it is brought into contact with conductors 61 and 62 at the various points along the guide where the slotted portion closely approaches the conductors. As the extension traverses the guide indicated in the drawings, it moves first to the right where it contacts conductor 61, then to the left where it contacts conductor 62, then to the right where it contacts conductor 61 again, then to the right, left, left, right, left, right, left, left, and right contacting the corresponding conductor with each movement until the extension reaches the finish position. The extension is held at the finish position until electromagnet 18 is deenergized when the operator releases the identification switch. The connections made between the armature extension and conductors 61 and 62 serve to complete an electrical path between the positive terminal of battery 63 and one or the other of the input terminals of the modulator. This path is completed as follows: From the positive terminal of battery 63 through a conductor to the identification switch; through the closed identification switch and a conductor to spring 17; through spring 17, the relay armature, and the relay extension to conductor 61 or 62 depending upon whether the extension is at the right or left side of the guide; and from conductor 61 or 62 through a conductor to the upper or the lower input terminal of the reactance modulator. Since the negative terminal of battery 63 is connected to a tap on the secondary of the microphone coupling transformer, connection of the positive battery terminal through conductor 62 to the upper terminal of the modulator input serves to change the grid bias on the reactance modulator tube from the normal value to a value which shall be designated $E_{gL}$. This change in grid bias to $E_{gL}$ causes a corresponding change in the reactance which the modulator presents to the radio frequency oscillator circuit, and as a result the transmitter is caused to emit a signal of a certain frequency, which shall be designated $F_L$. When the armature extension is at the right side of the guide, the positive battery terminal is connected to the lower modulator input terminal and the grid bias on the reactance modulator tube is changed to a value which shall be designated $E_{gR}$. The signal which the transmitter emits when the grid bias on the reactance modulator tube is $E_{gR}$ shall be designated $F_R$. The frequencies $F_R$ and $F_L$ differ from the carrier frequency by approximately the same amount and one is higher than and the other is lower than the center frequency depending upon the connections within the modulator circuit. Thus, it is seen that when the identification switch is closed the transmitter at the mobile station is caused to send out a series of radio frequency signals comprising two frequencies $F_L$ and $F_R$, and the number and sequence of these signals is determined by the design of the guide used in the selective signaling device. Applying the four-digit calling number code described for the apparatus indicated in Fig. 4, the guides indicated in Fig. 6 and Fig. 7 are designed to represent the code numbers 5052. When the identification switch is opened electromagnet 18 is deenergized and battery 63 is disconnected from spring 17 of the selective signaling device. As soon as electromagnet 18 is deenergized, the yoke, armature and armature extension combination is moved under the influence of spring 17 in a counter-clockwise direction about shaft 10 until the extension automatically reaches the start position of the guide. The apparatus is secured in this position by spring 17 until electromagnet 18 is again energized.

The code signals transmitted by the mobile station are received and recorded at the fixed station by the receiving apparatus indicated in Fig. 6 which comprises a conventional receiver which is adapted to respond to frequency-modulated signals and to which a pen recorder has been attached. The pen recorder is of conventional design and is adapted to record on tape a graph corresponding to the voltage applied to the recorder input. The pen recorder is connected across the output of the discriminator circuit of the receiver so that the graph which the recorder produces indicates in qualitative manner the direct current voltages as rectified by the discriminator. Fig. 8 indicates a typical pen recorder record in which the upward deviations of the graph from the center of the record indicate that the receiver has responded to radio frequency signal $F_R$ and the downward deviations indicate response to $F_L$. The graph indicates the record which corresponds to guide 64 of the selective signaling device and represents identifying signal 5052.

For application to a two-wire telephone line, it is necessary to modify the selective responding relay as indicated in Fig. 9 and Fig. 10. The drawing in Fig. 9 is an elevation view of the device in which the guide and the two end supports for the guide are not shown. The relay as modified differs from the relay indicated in Fig. 1 as follows: A permanent magnet has been introduced between the pulsing electromagnet supports, the electromagnet supports are made of soft iron, the base to which the supports are attached must be made of non-magnetic material, the guide is reversed so that its start position is towards the front and its finish position is at the rear of the instrument, and the number of steps in the guide have been reduced. With this arrangement the relay is magnetically polarized so that the electromagnet at the left side of the relay represents one magnetic pole and the electromagnet at the right side represents the other magnetic pole.

An alternative construction for producing a polarized selective responding relay is obtained by permanently magnetizing the yoke and, mounting the soft iron electromagnet supports on the magnetized yoke. In a relay of this type the permanently magnetized yoke, electromagnet supports and pulsing electromagnets rotate about shaft 10 as the armature rotates. Such an arrangement is not adapted to operate as rapidly as the apparatus disclosed in Fig. 9 and Fig. 10 since the mass which must be rotated is greater.

Fig. 10 illustrates an application of the polarized relay for signaling on a multiparty telephone line, and Fig. 11 is a schematic diagram of the connections to the electromagnets. Since the relay must be actuated by signals from a two-wire line, the windings for the three electromagnets are connected in series across the line and electromagnet 18 is shunted with condenser C. The capacitance of condenser C is large so that the condenser will offer a low impedance to short pulses of current and thereby prevent electromagnet 18 from responding to such pulses. Electromagnets 19 and 20 are polarized so that the relay armature is pulled to the left when voltage is applied to the line in such manner that conductor A is of positive polarity with reference to conductor B and so that the armature is pulled to the right when conductor A is of negative polarity with respect to conductor B.

Since the start position for the armature extension is toward the front of the relay in this modified form, it is necessary to rotate the armature, yoke and armature extension combination in a clockwise direction about shaft 10 and extend retractile spring 17 in order to enable the relay. The relay is enabled by applying to the line a pulse of current of relatively long duration compared to the signaling pulses. In Fig. 12 the voltage which causes such a pulse of current to flow is labeled "Enabling Pulse." This enabling pulse of current serves to energize the three electromagnets, electromagnet 18 tending to rotate the armature extension in a clockwise direction and electromagnets 19 and 20 tending to force the armature extension to one side of the guide. The slots of guide 16 are sloped so that the armature extension is permitted to traverse the guide toward the start position if a steady force of sufficient strength to overcome the pull of spring 17 and the frictional losses entailed by forcing the armature extension along one side of the guide is applied to rotate the extension about shaft 10. Electromagnet 18 is adapted to apply such a force through its attraction of the armature-yoke combination. When the relay is enabled it is prepared to respond to code pulses corresponding to the selective signaling code. A typical series of such pulses is indicated in Fig. 12. The apparatus for generating the enabling pulse as indicated in Fig. 10 comprises a key and a battery connected in series across the line. The apparatus for generating the code pulses comprises a coder of the type disclosed in Fig. 5.

Referring to Fig. 10, for an operator at the central office to call the subscriber's station illustrated, the enabling key must be depressed for a sufficient time to allow the relay armature extension to move to the start position on the guide, and then the operator must press the coder keys corresponding to the digits 52. At the subscriber's station the relay armature extension will move to the start position and then traverse the slotted guide step-by-step until it reaches the finish position and contacts conductor 21. This connection serves to short conductors 27 and cause the ringer to produce an audible signal. This short circuit across the ringer remains until the telephone hook is lifted or until another enabling pulse is sent by the operator.

Since the guide illustrated in Fig. 10 has six steps, the apparatus is adapted to distinguish one code from 64 codes and therefore it is adapted for use in communication systems wherein as many as 64 subscribers' stations are served by one line comprising two conductors.

It is to be understood that the design and applications of the apparatus as herewith described are to be taken as preferred examples of the same and that various modifications may be resorted to without departing from the spirit of the invention.

What is claimed is:

1. A relay comprising an armature free to move about two axes, a guide adapted to confine the movement of said armature to a predetermined path and adapted to prevent further movement of said armature if its movement tends to deviate from said predetermined path, means including two polarized electromagnets adapted to move the armature in either direction about its first axis, second magnetic means for actuating the armature about its second axis thereby permitting the armature to traverse the guide and completely respond in response to a certain combination of movements applied to the armature, said combination of movements being determined by the design of the guide, and means for restoring the armature to its starting position.

2. A selective responding device comprising an armature which must traverse a predetermined distance in order to complete its response, first magnetic means adapted to force the armature along a first direction, means adapted to confine said armature to a predetermined irregular path, and other magnetic means adapted to apply a succession of other forces to said armature in a direction substantially transverse to the direction of the force produced by said first magnetic means so that said armature will follow said predetermined path, thereby permitting the armature to travel said predetermined distance and complete its response.

3. A selective responding device comprising a controlled armature extension which must travel a predetermined distance in order to complete its response, means adapted to confine said controlled armature extension to a predetermined path comprising a succession of irregular steps containing alternate paths only one of which will allow the armature extension to travel said predetermined distance, magnetic means to move said armature extension longitudinally along said predetermined path, means to move said armature extension transverse to said longitudinal movement, said means to move said armature transversely cooperating with said magnetic means to move the armature extension longitudinally so that said armature extension will move along the correct alternate path to allow said armature extension to travel said predetermined distance, thereby permitting the armature extension to complete its response, and means for automatically restoring the controlled armature to its starting position when the means for actuating the controlled armature is deenergized.

4. A selective responding device comprising a controlled armature which must traverse a predetermined distance in order to complete its response, means adapted to confine said controlled armature over said predetermined distance in a predetermined irregular path, said path having a plurality of alternative paths characterized by non-responsive terminations, magnetic means to move said armature longitudinally along said path, and means to move said armature transverse to said longitudinal movement, said means to move said armature transversely cooperating with said means to move the armature longitudinally so that said armature will move along the desired path and will travel said predetermined distance, thereby permitting the armature to complete its response.

5. A relay comprising an armature supported about two axes, a first means adapted to confine the movement of said armature to a predetermined irregular path, a guide to determine said irregular path, said guide comprising a series of steps containing alternate paths, only one of which will allow the armature to continue along the said predetermined irregular path, a second magnetic means adated to move said armature longitudinally along said path, and a third magnetic means to move said armature transversely to the longitudinal movement, said second and third means acting together to permit the armature to complete its response by traversing said predetermined path.

6. In a relay, an armature, and a guide adapted to confine said armature to a predetermined irregular path and adapted to permit said armature to complete its response only when a predetermined series of forces is applied to said armature, said guide comprising a series of steps containing alternate paths, only one of which will allow the armature to continue along the said predetermined irregular path, and said predetermined series of forces comprising a magnetic force to move said armature longitudinally and a second magnetic force to move said armature laterally with respect to said longitudinal movement so that said armature will traverse said predetermined path, thereby permitting the armature to complete its response.

7. A relay comprising an armature free to move about two axes, a guide adapted to confine the movement of said armature to a predetermined path, said guide comprising a series of steps containing alternate paths, only one of which will allow the armature to continue along the said predetermined path, a first magnetic means adapted to move the armature in either direction about its first axis, and a second magnetic means adapted to move the armature about its second axis, thereby permitting the armature to traverse the guide and completely respond in response to a certain sequence of movements applied to the armature, said sequence of movements being determined by the design of the guide.

8. A selective responding device comprising a controlled armature, a first means adapted to confine said controlled armature to a predetermined irregular path, a second means adapted to actuate said controlled armature so that it will traverse said predetermined path, said second means applying a first magnetic force to move the armature in a longitudinal direction and a second magnetic force to move the armature laterally with respect to said longitudinal movement, said magnetic forces acting together to permit said selective responding device to complete its response, and means for automatically restoring the controlled armature to its starting position when the means for actuating the controlled armature is deenergized.

9. A relay comprising an armature free to move about two axes, a guide adapted to confine the movement of said armature to a predetermined path, said guide comprising a series of steps containing alternate paths, only one of which will allow the armature to continue along the said predetermined path, first magnetic means adapted to move the armature in either direction about its first axis, second magnetic means adapted to actuate the armature around its second axis thereby permitting the armature to traverse the guide and completely respond in response to a certain sequence of movements applied to the armature, said sequence of movements being determined by the design of the guide, and means for automatically restoring the armature to its starting position when the means for actuating the armature is deenergized.

10. A selective responding device comprising a controlled armature extension, first means adapted to confine said controlled armature extension to a predetermined irregular path and adapted to prevent further movement of said armature extension if its movement tends to deviate from said predetermined path, and further means adapted to move said armature extension so that it will travel said predetermined path, thereby permitting the selective responding device to complete its response, said further means applying a first magnetic force to move the armature extension longitudinally along said first means and a second magnetic force to move said armature extension in a direction substantially transverse to said longitudinal movement.

11. A relay comprising an armature free to move about two axes, a guide adapted to confine the movement of said armature to a predetermined path and adapted to prevent further movement of said armature if its movement tends to deviate from said predetermined path, said guide comprising a series of steps each containing alternate paths, only one of which will allow the armature to continue along the said predetermined path, first magnetic means adapted to move the armature in either direction about its first axis, and second magnetic means adapted to move the armature about its second axis thereby permitting the armature to traverse the guide and completely respond in response to a certain sequence of movements applied to the armature, said sequence of movements being determined by the design of the guide.

WALTER KOENIG, Jr.

REFERENCES CITED

The following references are of record in the file of this patent:

UNITED STATES PATENTS

| Number | Name | Date |
|---|---|---|
| 408,224 | Eddy | Aug. 9, 1889 |
| 859,534 | Watkins | July 9, 1907 |
| 1,205,460 | Lyons | Nov. 21, 1916 |
| 1,969,978 | Hanel | Aug. 14, 1934 |
| 2,437,242 | Cole | Mar. 9, 1948 |